United States Patent [19]
Wickens et al.

[11] Patent Number: 5,332,502
[45] Date of Patent: Jul. 26, 1994

[54] WASTEWATER TREATMENT

[75] Inventors: Denys A. Wickens, Flagtown, N.J.; Brian J. Johnson, Gladesville; Mervyn R. Ogston, Rocklea, both of Australia

[73] Assignee: The Commonwealth Industrial Gases Ltd., St. Leonards, Australia

[21] Appl. No.: 72,659

[22] Filed: Jun. 4, 1993

Related U.S. Application Data

[63] Continuation of Ser. No. 946,252, Sep. 16, 1992, abandoned, which is a continuation of Ser. No. 785,740, Oct. 31, 1991, abandoned.

[30] Foreign Application Priority Data

Nov. 2, 1990 [AU] Australia .................. PK3149

[51] Int. Cl.$^5$ .................. C02F 3/26; C02F 3/30
[52] U.S. Cl. .................. 210/605; 210/614; 210/627; 210/903
[58] Field of Search .................. 210/605, 614, 620, 623, 210/630, 604, 903, 906

[56] References Cited

U.S. PATENT DOCUMENTS

| | | | |
|---|---|---|---|
| 3,725,258 | 4/1973 | Spector et al. | 210/614 |
| 3,954,606 | 5/1976 | Block et al. | 210/627 |
| 3,973,043 | 8/1976 | Lynn | 210/605 |
| 3,986,932 | 10/1976 | Brushwyler et al. | 210/614 |
| 3,994,802 | 11/1976 | Casey et al. | 210/627 |
| 4,246,099 | 1/1981 | Gould et al. | 210/630 |
| 4,271,926 | 6/1981 | Chen et al. | 210/605 |
| 4,280,910 | 7/1981 | Baumann | 210/614 |
| 4,430,224 | 2/1984 | Fuchs | 310/627 |
| 4,460,470 | 7/1984 | Reimann | 210/605 |

FOREIGN PATENT DOCUMENTS

| | | |
|---|---|---|
| 0053396 | of 1982 | European Pat. Off. |
| 0108730 | of 1984 | European Pat. Off. |
| 58-55094 | 4/1983 | Japan |
| 1417573 | of 1985 | United Kingdom |

Primary Examiner—Christopher Upton
Attorney, Agent, or Firm—David A. Draegert; Larry R. Cassett

[57] ABSTRACT

A method for efficiently treating wastewater by aerobic digestion whereby on-site oxygen generating equipment continually provides a predetermined quantity of dissolved oxygen to the wastewater, the dissolved oxygen content being maintained at a predetermined level during peak flows by air being dissolved into the wastewater. The method being used for upgrading the capacity of an existing plant to treat wastewater; increasing the scope of an existing plant to allow removal of biological nitrogen and/or phosphorus; and designing new wastewater treatment plants. Further efficiency is introduced by using methane produced, during subsequent anaerobic digestion of the wastewater, to fuel compressors or the like which provide the air to the wastewater.

17 Claims, 4 Drawing Sheets

WASTEWATER TREATMENT

This is a continuation of application Ser. No. 07/946,252 filed 16 Sep. 1992, now abandoned, which is continuation of 07/785,740 filed 31 Oct. 1991 now abandoned.

TECHNICAL FIELD

The present invention relates to the treatment of wastewater and in particular to a method of treating wastewater with energy efficiency, at fluctuating flows, and above design capacity.

BACKGROUND OF THE PRIOR ART

The invention has been developed primarily for use with the treatment of organically polluted aqueous phases, especially oily wastewater and sewerage and will be described hereinafter with reference to this application. However, it will be appreciated that the invention is not limited to this particular field of use and could be used for the treatment of other types of aqueous waste streams such as leachate, run-off, and those streams containing oxidizable inorganic matter.

Hitherto, the secondary treatment of wastewater has generally been achieved through the activated sludge process or other like methods. Due to the large variation in both the flow and content of the wastewater to be treated, the different stages of the process have been carried out in a relatively independent way. As a result a substantial excess of material is left untreated, particularly during peak flows. This material commonly remains untreated. A further effect is that the variations are carried through to the quantities of biomass produced by such treatment, commonly called "sludge" as well as primary solids. For purposes of the present invention, "sludge" will include primary solids.

This problem is further exacerbated due to the wastewater treatment plants being generally designed for maximum capacity. When the supply of wastewater increases due to diurnal, seasonal and special factors, the plant may become overloaded due to the subsequent increase in wastewater volume or pollutant concentrations. It is generally understood that the limiting factor for pollutant treatment in such a system is the oxygen transfer capacity of the aeration system, since oxygen exposure times are set by the treatment plant hydraulic characteristics, such characteristics being influenced solely by flow, irrespective of the requirement of the pollutants for oxygen for effective treatment.

Furthermore, in certain circumstances, to ameliorate the overloading problem of the treatment system due to extra inflows of wastewater, large storage tanks or "lagoons" are provided. However, in an urban environment where space is at a premium, this alternative is not always available.

Previously, new specially designed tanks have been used to reduce the retention time when oxygen has been used for aeration. However, as mentioned above, this is often a relatively expensive alternative. Conversion of existing tanks is, at best, difficult and costly.

To overcome the limits on aeration capacity, it is possible to provide supplemental oxygen to the wastewater by such means as disclosed in U.S. Pat. No. 4,163,712. This technique requires that oxygen generated at a remote location be transported to the plant resulting in considerable costs associated with liquid production, storage and transportation.

Alternatively, on-site generation of oxygen has also been used in hope of reducing the above mentioned costs. However, the high capital costs of methods of producing the oxygen from air require machinery which is preferably operated at close to the maximum design capacity. This feature of such machinery is not well suited to provision of oxygen due to the large diurnal and seasonal fluctuation of the wastewater flow and composition. Although such on-site methods have been economically impractical to implement, effective pollution control can be established.

Furthermore, when air not enriched with oxygen is used as a source of oxygen for such wastewater treatment, the partial pressure of nitrogen is much greater than the partial pressure of oxygen. Consequently, only a relatively small amount of oxygen is absorbed into solution and excessive frothing of the wastewater may occur. In contrast, when substantially pure oxygen is used in an efficient manner, then poor stripping of carbon dioxide occurs, causing excessive acidity.

SUMMARY OF THE INVENTION

The present invention overcomes or substantially ameliorates at least one of the deficiencies of the prior art.

The present invention provides a method for treating wastewater by aerobic digestion, said method including:

introducing into said wastewater a first fluid including an oxygen content of at least 50% to provide a selected base load aerobic digestion capacity; and, selectively introducing into said wastewater a second fluid to provide an additional variable load aerobic digestion capacity, wherein said base load and said variable load capacity in total provide a selected total aerobic digestion capacity.

The selected total aerobic digestion capacity is preferably chosen to provide an acceptable capacity to meet peak loads. This can for example be selected as sufficient capacity to satisfy the 95th percentile of peak oxygen demand.

Preferably the first fluid is produced on site in conjunction with the wastewater treatment.

Preferably also the first fluid is substantially oxygen, or air enriched with oxygen, which is introduced to the wastewater by a conventional oxygen dissolver. The second fluid, being air, is preferably introduced via conventional means, such means including either compression and subsequent diffusion, or a mechanical means or both.

In a preferred form, the first fluid would include a concentration of at least 70% oxygen either being produced by pressure swing absorption or cryogenic methods. The second fluid being substantially air allows sufficient nitrogen to enter the wastewater to enable or facilitate stripping of carbon dioxide therefrom. It will be appreciated that the use of conventional means to introduce the second fluid will further this effect. Alternatively, use of air enriched with oxygen in place of substantially pure oxygen may be used to effect stripping.

Preferably also, the wastewater having been treated is sampled for providing a first signal indicative of the dissolved oxygen content thereof. The air compression or dissolution means is responsive to the first signal to maintain a predetermined dissolved oxygen concentration in the wastewater.

The oxygen dissolver may be any device normally yielding an oxygen transfer efficiency in excess of 70%, preferably in excess of 90%, such devices include ultrafine bubble diffusers, inverted cones, enclosed waterfalls and static mixers.

According to a second aspect of the invention, there is provided a method for treating sludge derived from wastewater including the steps of:

treating the sludge by aerobic digestion is described above;

allowing anaerobic digestion of said wastewater in a conventional manner whereby methane extracted in this subsequent digestion fuels the compression means;

controlling the transfer of said wastewater and sludge streams from a central data processing unit to maintain said treatment substantially in a dynamic equilibrium during variations in the wastewater conditions including;

1. quantity of wastewater entering system,
2. compositions of the wastewater entering,
3. the dissolved oxygen content, temperature, biological oxygen demand, pH and relevant flows of the wastewater being treated; and,
4. previously obtained data relating to the expected inflow due to diurnal and seasonal conditions, the expected lead time between respective process steps and the relationship between these lead times and the current trend.

Preferably, the central processing unit is responsive to signals indicative of the status of one or a combination of predetermined valves, pumps, compression means, and other mechanical devices.

Preferably also, methane obtained from the wastewater, as it progresses through the process described above, is collected and utilized for fueling the compressing means. The methane is suitably regulated between collection and combustion points by valves, which are preferably linked with the central data processing unit.

BRIEF DESCRIPTION OF THE DRAWINGS

A preferred embodiment of the invention will now be described, by way of example only, with reference to the accompanying drawings in which.

DETAILED DESCRIPTION OF THE INVENTION

Figure 1:
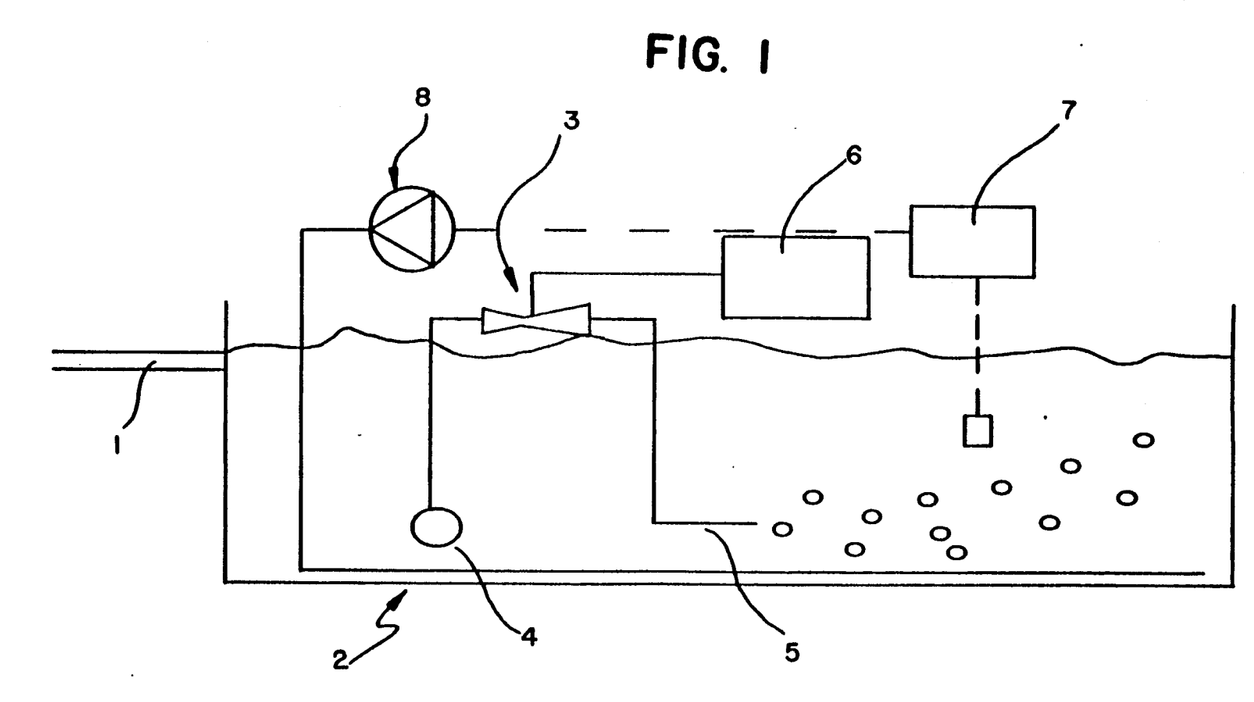
FIG. 1 is a schematic view of a wastewater flow being treated according to one aspect of the invention.

Referring to FIG. 1 a wastewater flow is passed through an appropriate channel 1 into an aeration tank 2. A portion of the body of this wastewater is removed from the main flow into an oxygen dissolver 3 through a pump 4. Air enriched with oxygen is then dissolved using a VITOX ® injection system as described in U.S. Pat. No. 4,163,712 which is incorporated herein by reference. It will also be appreciated that pure oxygen can be used.

Following the dissolving step the wastewater is reinjected into the main flow through an outlet 5 for establishing a predetermined dissolved oxygen content and agitating the flow for sustaining the solids in suspension.

The oxygen dissolver 3 is supplied air enriched with oxygen, whereby the oxygen concentration is greater than 60% and preferably greater than 80% and more preferably greater than 90%. It has been found that the introduction of dissolved oxygen from air is more energy efficient when the oxygen purity is within the above ranges. Furthermore, an oxygen purity in the range of 80%–95% allows energy efficiency while continuing to provide effective stripping of $CO_2$.

The above values of oxygen purity are based on energy consumption, with a substantially pure oxygen dissolution system achieving 3.2 kg/kW-hr. Any purity degradation is not able to be rectified by increased gas loading due to mechanical limitations and as such the energy cost increases linearly on a kg/KW-hr basis. This value is converted to kW-hr/kg to give the energy cost of air separation (0.310 kW-hr/kg, PSA basis). Taking into account the 90% transfer efficiency of dissolution, the energy costs are increased by dividing by 0.9. When the energy cost rises above 1 kW-hr/kg, the air enriched with oxygen becomes more expensive than air. Calculations for a number levels of oxygen purity are illustrated tn Table 1.

TABLE 1

| Oxygen % | Dissolution | | Total Energy |
|---|---|---|---|
|  | kg/kW-hr | kW-hr/kg | kW-hr/kg |
| 100 | 3.20 | 0.313 | 0.696 |
| 93 | 2.98 | 0.336 | 0.722 |
| 90 | 2.88 | 0.347 | 0.734 |
| 80 | 2.56 | 0.391 | 0.783 |
| 70 | 2.24 | 0.446 | 0.844 |
| 60 | 1.92 | 0.521 | 0.927 |
| 50 | 1.60 | 0.625 | 1.043 |

The oxygen is supplied from a separator 6 which operates by the pressure swing absorption (PSA) method. However, it will be appreciated that cryogenic or other suitable means may be used depending upon the oxygen purity required. PSA systems are inherently limited to produce oxygen having a purity of up to about 95%. A practical limitation is 93%. However, cryogenic systems are able to achieve purities up to 98%.

The air separator is run at a substantially constant rate, being at or near its maximum rate, for achieving the greatest efficiency. This results in the addition of a predetermined volume of oxygen to the wastewater to provide a base load aerobic digestion capacity.

Instrumentation 7 supplies a signal indicative of the dissolved oxygen content of the wastewater. Should this dissolved oxygen content fall below a predetermined level due to an excess of wastewater above the predetermined volume entering the treatment process an air compressor 8, responsive to the signal, will supply air to the wastewater at a rate controlled to restore dissolved oxygen content.

It will be apparent that having the air separation equipment running at a near maximum rate achieves a high efficiency. The efficiency is also increased by the fueling of compressors 8, feeding air to separator 6, with methane produced in subsequent treatment of the wastewater.

The air separator 6 operating at such a level is generally less expensive to use than other methods such as introducing substantially pure oxygen obtained from a liquified source. The use of liquid oxygen results in associated liquification, handling, transportation and conversion costs.

For adequate stripping of carbon dioxide to occur, the air should supply at least 3.3%. of the total dissolved oxygen and preferably 7.2% to 12% of the dissolved oxygen. This is based upon empirical data which illustrates that a minimum of 3 kW of aeration is required to strip $CO_2$ from a system oxidizing one ton/day of carbonaceous pollution (BOD).

In this preferred embodiment the oxygen content of the enriched air is approximately 80% and as such contains a sufficient nitrogen content to help remove substantial quantities of carbon dioxide from the wastewater. This accelerates respiration of the resulting sludge and prevents undue corrosion of tanks, pipes and other concrete fixtures with which the wastewater comes into contact.

Existing treatment plants are able to be up-graded to accord with the present invention. The size of the air separation unit in such a treatment plant is determined in such cases (for the purpose of economic evaluation) by subtracting the capacity of the existing aeration system from the 95 percentile at peak demand.

The presence of stored liquid oxygen capacity (usually held in reserve to cope with scheduled and unscheduled maintenance) could readily be used to extend the capacity of the up-graded system to cope with still higher percentile demands.

Prior art design of aeration and oxygenation systems requires accommodation of diurnal or other reasonably foreseeable peak demand. This is generally taken to be at least the 95 percentile of the diurnal peak demand. Furthermore, the basis subsequently used in computations of costs using turn-down is that the both air delivery devices (such as fans and compressors) and molecular sieve regeneration devices (such as vacuum pumps) may be turned down using prior art load/unload appurtenances according to the formula:

*Actual Power Consumption = (0.2 + 0.8 \* fractional throughput)\*(rated power consumption)*

It will be appreciated that a cryogenic air separation plant may be turned down only to approximately 50% of capacity to Keep the distillation column wetted.

In the prior art covered tank pure oxygen processes, the oxygen generator must be operated at 20% or more below capacity about 80% of the time. Turn-down of the dissolution system power in that system cannot be practiced because of the requirement to maintain the biological solids in suspension.

In prior art air systems the case is similar, but there is no gas purification cost. Mixing considerations provide a limit on turn-down for such systems, at about 25W/$m^3$ of power dissipated per tank volume. In prior art air systems supplemented with imported oxygen vaporized from liquid products manufactured at a remote location, the benefits of turn-down (on the oxygen part of the system) are set against the higher cost of this form of oxygen.

The following examples help to illustrate the advantages of the present invention.

EXAMPLE 1

A wastewater treatment plant originally designed to supply 300 kg of dissolved oxygen per hour from air at 100% power of 300 kW and having to meet diurnal flow characteristics of Table 2 is to be upgraded to account for increases in overall flow above the original design capacity. The summary results, from comparisons of this invention to the prior art, are given in Table 3. Demand data is calculated by taking a BOD of 240 mg/l and an ammonia concentration of 35 mg/l as the strength of the influent which is used to calculate the respective oxygen demands for removal of carbonaceous pollution (BOD) and oxidation of ammonia to nitrogen (NOD). BOD is biological oxygen demand and NOD is nitrogenous oxygen demand.

*BOD Oxygen demand (lb/hr) = [Flow (millions of gallons/day) × BOD(mg/l) × 8.34]/ 24*

*NOD Oxygen demand (lb/hr) = [Flow (Millions of Gallons/day) × ammonia(mg/l) × 8.34 × 1.4]/ 24*

TABLE 2

Flow and Demand Profile

| Time of Day | Flow $m^3$/day | Flow (mgd) | Std. Dev. 95 pct (mgd) | Std. Dev. 95 pct (mgd) | Av. demand (lb/hr, BOD) | Av. demand (BOD + NOD) |
|---|---|---|---|---|---|---|
| Midnight | 42600 | 11.27 | 1.14 | 13.8 | 940 | 1132 |
| 01:00 | 39690 | 10.50 | 1.32 | 12.0 | 876 | 1054 |
| 02:00 | 36670 | 9.70 | 1.68 | 11.5 | 809 | 974 |
| 03:00 | 33260 | 8.80 | 1.92 | 10.0 | 734 | 884 |
| 04:00 | 29860 | 7.90 | 2.08 | 9.5 | 666 | 793 |
| 05:00 | 27140 | 7.18 | 1.97 | 8.4 | 599 | 721 |
| 06:00 | 25630 | 6.78 | 1.87 | 8.5 | 565 | 681 |
| 07:00 | 26270 | 6.95 | 1.99 | 10.5 | 580 | 698 |
| 08:00 | 30240 | 8.00 | 1.87 | 11.5 | 667 | 803 |
| 09:00 | 34740 | 9.19 | 2.42 | 14.5 | 766 | 923 |
| 10:00 | 44910 | 11.88 | 2.45 | 15.1 | 991 | 1193 |
| 11:00 | 51370 | 13.59 | 1.45 | 15.7 | 1133 | 1364 |
| Noon | 50610 | 13.39 | 1.14 | 16.0 | 1117 | 1344 |
| 13:00 | 55680 | 14.73* | 1.81 | 17.0 | 1228 | 1479 |
| 14:00 | 49780 | 13.17 | 1.63 | 16.5 | 1098 | 1323 |
| 15:00 | 47650 | 12.58 | 1.60 | 16.0 | 1049 | 1263 |
| 16:00 | 45590 | 12.06 | 1.28 | 15.0 | 1006 | 1211 |
| 17:00 | 44260 | 11.71 | 1.27 | 14.2 | 977 | 1176 |
| 18:00 | 43730 | 11.57 | 1.22 | 14.0 | 965 | 1162 |
| 19:00 | 43890 | 11.61 | 1.11 | 14.0 | 968 | 1166 |
| 20:00 | 44420 | 11.75 | 1.14 | 13.8 | 980 | 1180 |
| 21:00 | 45170 | 11.95 | 0.96 | 13.7 | 997 | 1200 |
| 22:00 | 45320 | 11.99 | 0.99 | 13.7 | 995 | 1204 |
| 23:00 | 45210 | 11.96 | 1.12 | 14.5 | 997 | 1201 |

*Value routinely distorted by bar screen cleaning, 14:00 value used for peak demand calculations.

The factor of 24 is introduced to convey to hours as the flows are given in time units of days. For example, according to Table 2 at 13:00 a flow of 14.73 mdg converts to a demand of (14.73 × 240 × 8.34)/24 = 1228 lb/hr.

Option 1 illustrates the effect of adding an oxygen system such that the oxygen supply capacity of this system plus half the capacity of the existing air system can satisfy the demand at the 95 percentile flow of the 14:00 peak demand which is 1376 lb/hr or 625 kg/hr, based on a 95 percentile flow of 16.5 million gallons per day. For this option the on-site oxygen generation and dissolution system is run at maximum capacity. The air system consists of two blowers, and is run in turn-down mode using whichever is cheapest of one, or two blowers, or replacing one or both with supplemental oxygen. The oxygen system is run continuously without turn-down while the air system is operated turned down until it matches demand.

TABLE 3

Overall Energy Costs for Plant BOD Upgrades

| Option | Design Basis | Cost kW-hr | Supply Rate Max: kg/hr |
|---|---|---|---|
| 1 | O$_2$ + half the Air = 95%ile of peak | 7,400 | 760 |
| 2 | O$_2$ + Air = Average peak demand | 8,400 | 515 |
| 3 | Air + Supplemental O$_2$ | 10,360 | 760 |
| 4 | UNOX 95% of peak | 7,620 | 625 |
| 5 | O$_2$ + half the Air = 95%ile of peak (some turn-down) | 6,260 | 760 |

At both 13:00 and 02:00, the on-site oxygen system consumes 206 kW-hr to separate air and dissolve the resulting oxygen. It meets 715 lb (325 kg) of the demand. At 13:00, the air system supplies the rest of the demand (513 lb; 233 kg). It consumes 246 kW-hr, calculated from 78% of its maximum air capacity requiring 82% of its maximum power. (Power=20%, 78*0.8%–82%). Subsequently, the total power at 13:00 is 206+246=452 kW-hr.

At 02:00 the air system would be required to supply 809−715=94 lb (43 kg) of dissolved oxygen. This is 14% of its rated capacity, consuming 31% of its rated power. This comes to 2.23 kW-hr/kg, more than the value of 1.313 kW-hr/kg assigned to a supplemental oxygen system. Supplemental oxygen is therefore used, at a cost of 43×1.313 kW-hr, or 55 kW-hr. That is, the total at 02:00 is 206+55=261 KW-hr.

Values for the energy costs at the other time are able to be calculated in a similar manner. The summation of such costs over a daily period are illustrated in Table 4 in the cost column.

Option 2 includes the addition of an oxygen system which in conjunction with the existing air system satisfies the 14:00 average demand of 1133 lb or 515 kg. This is lower than the 13:00 demand, but does not suffer from the flow measurement artifacts caused by cleaning the bar screens. This option requires a lower capital cost than the basis chosen in option 1. Switch-over to a supplemental (liquid storage) oxygen system is performed when the demand is insufficiently greater than the on-site system to justify turning on the air system, or when the average demand is exceed at peak hours. The oxygen system is run continuously without turn-down. The air system is operated turned down until it matches demand.

At both 13:00 and 02:00, the on-site oxygen system consumes 140 kW-hr to separate air and dissolve the resulting oxygen. It meets 486 lb (221 kg) of the demand. At 13:00, the air system attempts to supply the rest of the demand (742 lb, 337 kg). At maximum capacity the air system supplies 660 lb (300 kg). It consumes 300 kW-hr, calculated from 100% of its maximum capacity requiring 100% of its power. The rest of the demand (84 lb, 38 kg) is met with supplemental oxygen at 1.313 kW-hr/kg equivalent energy cost, that is, 38×1.313=50 kW-hr. This gives a total at 13:00 of 140+50=490 kW-hr.

At 02:00 the air system is required to supply (809–486 lb), or 323 lb (147 kg) of dissolved oxygen. This is 49% of its rated capacity, consuming 59% of its rated power. This comes to 1.21 kW-hr/kg, less than the value of 1.313 kW-hr assigned to a supplemental oxygen system. The air system consumes 300×0.59=177 kW-hr. That is, the total at 02:00 is 140+177=317 kW-hr.

Option 3 is the prior art solution and involves upgrading the existing air system such that it is capable of matching the daily average demand (900 lb/hr, 409 kg/hr). A supplemental (liquid storage) oxygen system is added to match demand. The air system is operated turned down whenever possible. The turn-down of the supplemental system is 0–100%.

At 13:00 the demand is 1228 lb (558 kg), of which 338 lb (154 kg) is not met by the air system and has to be supplied by 154 kg of supplemental oxygen at 1.313 kW-hr/kg equivalent cost, that is, 202 kW-hr, requiring a total at 13:00 of 409+202=611 kW-hr. At 02:00 the demand is 809 lb (368 kg). The air system turned down to 90% output at 92% of its power draw will consume 409×0.92=276 kW-hr. The total at 02:00 is 376 kW-hr.

Option 4 includes the conversion of the prior art UNOX or OASES processes. With such processes the mixing and dissolution component is fixed by the power required to dissolve enough oxygen to meet peak demand which in this example is the 95 percentile value of the 14:00 peak value (1376 lb/hr or 625 kg/hr). It cannot be turned down from this value without degrading the ability to keep the contents of the aeration basin mixed and the biological solids in suspension.

For this example the mixing/dissolution power demand is 179 kW. The oxygen generation system turns down in accordance with the formula, from a maximum value of 625 kg/hr using 175 kW.

At 13:00 the oxygen system produces 1228 lb (558 kg), 91% of its capacity, using 93% of its maximum power. That is, 175×0.93=163 kW-hr giving a total at 13:00 of 179+163=342 kW-hr.

At 02:00 the oxygen system produces 809 lb (368 kg), 60% of its capacity, using 68% of its maximum power. That is, 175×0.68=119 kW-hr. The total at 02:00 is 179+119=298 kW-hr.

Option 5 is the same as option 1, except that extra allowance is made for turning down the oxygen component of the system.

The oxygen dissolution system consists of 5 discrete units (pumps), and to be capable of turn-down by shutting them off one by one when the demand dropped below 80%, 60% etc. of the total. This turn-down ability has little impact on the pumping costs in this example, but is included to avoid unrealistically high assumptions for turn-down by treating the system as if it turned down in the same manner as when it is used with stored oxygen.

The air system consists of two blowers, of which only one is used when less than 50% of the air is needed. Supplemental (liquid storage) oxygen is used if the next result is cheaper than operating two blowers at just over 50% turn-down.

At 13:00 the oxygen system is using all 5 pumps drawing a total of 206 kW; the oxygen system delivers 483 lb (219 kg) of oxygen. The air system supplies all the residual demand of 745 lb (233 kg), operating both blowers turned down to 78% of the maximum value, consuming 82% of the maximum power, 300×0.82=246 kW-hr. The alternative scheme of operating one blower at maximum capacity and trimming the difference with supplemental (liquid storage) oxygen is a little more costly at 259 kW-hr. The total at 13:00 is 206+246=452 kW-hr (the same as option 1). At 02:00 the system is also the same as in option 1.

Between 04:00 and 08:00, the oxygen supply system operates in turn-down mode. At 06:00, the oxygen dissolution system is also turned down.

EXAMPLE 2

A treatment plant with the same flows as in Example 1, but equipped with 410 kg/hr of oxygen delivery capacity (i.e. not overloaded in its original design scope) is to be upgraded from carbonaceous BOD removal to include biological nitrogen removal. To accomplish this, 50% of the plant is to be converted to substantially anoxic operation, as known in the art. Alternatively, to upgrade from carbonaceous BOD removal to include biological phosphate removal, a portion of the plant could be converted to substantially anaerobic operation, known in the art. Finally, to upgrade from carbonaceous BOD removal to include both biological nitrogen removal and biological phosphate removal, a portion of the plant could be converted to a combination of both substantially anoxic and anaerobic operation, known in the art. The biomass concentrations adjusted both to account for this conversion, to increase the sludge age, and to reduce plant specific loading (kg pollution per kg biomass per day), all to ensure stable nitrification. The plant operating control point for dissolved oxygen is to be re-set to 2 ppm from 1 ppm for the same reason.

The summary results, from comparisons of this invention to the prior art, are given in Table 4. Prior art covered tank pure oxygen systems cannot be made to operate in a partially anoxic mode and are excluded from comparison.

TABLE 4

Overall Energy Cost for Plant Upgrades to Nitrogen Removal

| Option | System | Design Basis | Cost (kW-hr/day) |
|---|---|---|---|
| 1 | This Invention | $O_2$: Average of Peak Flow | 8,436 |
| 2 | This Invention | $O_2$: 24 hr Avg. Flow | 8,750 |
| 3 | Air + Supply $O_2$ | Air: 24 hr Avg. Flow | 14,462 |

When using option 1 the oxygen system is designed either for (a) twice the instantaneous dissolved oxygen supply, but operation for half the time or (b) addition of all of the oxygen to half the plant tank volume. The oxygen system is sized to accommodate the average peak demand. The air system is thus used only rarely.

Allowance is made for turning down both air and oxygen system. The oxygen dissolution system was assumed to consist of 5 discrete units (pumps), and to be capable of turn-down by shutting them off one by one when the demand dropped below 80%, 60% etc. of the total. (This turn-down ability has much more impact on pumping costs here than in the previous usage in Example 1, Option 5). It is included in this form to avoid unrealistically high assumptions for turn-down by treating the system as if it turned down in the same manner as when it is used with stored oxygen. The air system was assumed to consist of two blowers, of which only one would be used when less than 50% of the air was needed. Supplemental (liquid storage) oxygen would be used if the net result is cheaper than operating two blowers at just over 50% turn-down.

To illustrate the energy costs associated with this example, values will be calculated at 13:00 and 02:00; however, the values at the other times are similarly calculated and summed to give a total energy cost for a daily period.

At 13:00 the demand is 1479 lb (672 kg). The pure oxygen system is operating at a maximum and draws 359 kW: 186 kW for dissolution, and 173 kW for air separation. It delivers 1307 lb (594 kg).

The residue (168 lb, 76 kg) is supplied by the existing air system. At 2 ppm dissolved oxygen, its capacity is de-rated from 410 kg/hr at 410 kW to 364 kg/hr (basis: 18° C.). Assuming that it consisted of two blowers (of 205 kW each), the required supply turn-down of the one blower in service for this demand is 76/182=42%. The power draw is 53% of the rated 205 kW, of 109 kW. That is, the total=186+173+109 kW=468 kW.

At 02:00 the demand is 974 lb/hr (443 kg/hr), or 75% of maximum capacity. The number of pumps in service is reduced to 4 (from 5), and the dissolution cost cut by 20% to 149 kW. The oxygen supply system draws 80% of its rated power to supply 75% of its rated oxygen, or 138 kW. The total=(186×0.8)+138=287 kW.

Option 2 is similar to option 1, however, the oxygen system is sized based on the daily average demand (1085 lb, 493 kg). The rest of the demand is made up using the air system.

At 13:00 the first 1085 lb (493 kg) of the demand is supplied by the oxygen system, using 154 kW for dissolution and 144 kW for air separation. The rest of the demand (394 lb, 179 kg) is met by the air system. This is one blower operated at 98% of its maximum delivery, drawing 99% of its power (202 kW), and giving a total=154+144+202=500 kW.

At 02:00 demand is 974 lb/hr (443 kg/hr), 90% of the rated output to the oxygen system (insufficient reduction to turn off one of the pumps). The dissolution cost stays at 154 kW; the air separation cost is reduced to 92% of the maximum value, or 132 kW. The total=154+132+286 kW.

Option 3 is the prior art approach of design an air-based system for daily average demand, with (liquid storage) oxygen used for peak shaving. Turn-down of the air-based system is incorporated.

At 13:00 the air system is operated at maximum capacity to supply 1085 lb (492 kg) of dissolved oxygen. The remainder (394 lb, 179 kg) is supplied at an equivalent energy cost of 1.313 kW-hr/kg from (liquid storage) oxygen. The total is 554+179×1.313=789 kW.

At 02:00 the demand is 974 lb (443 kg), 90% of the rated output of the air system, which will draw 92% of the maximum power. The total is 554×0.92=510 kW.

EXAMPLE 3

Example 1, option 1 and 5, are reworked to account for use of sludge digester gas to generate mechanical work, such work done to deliver compressed air to diffusers. The air is beneficially used (a) to reduce oxygen demand, (b) to strip carbon dioxide in order to stabilize pH around neutrality, and (c) to maintain a minimum flow at all times though the plant's diffusers to prevent clogging. The results are set forth in Table 5.

TABLE 5

Overall Energy Costs After Sludge Energy Recovery

| System | Energy Cost Before | Energy Cost After |
|---|---|---|
| Table 3, Option 1 | 7400 | 6900 |
| Table 3, Option 5 | 6260 | 5760 |

Figure 2:
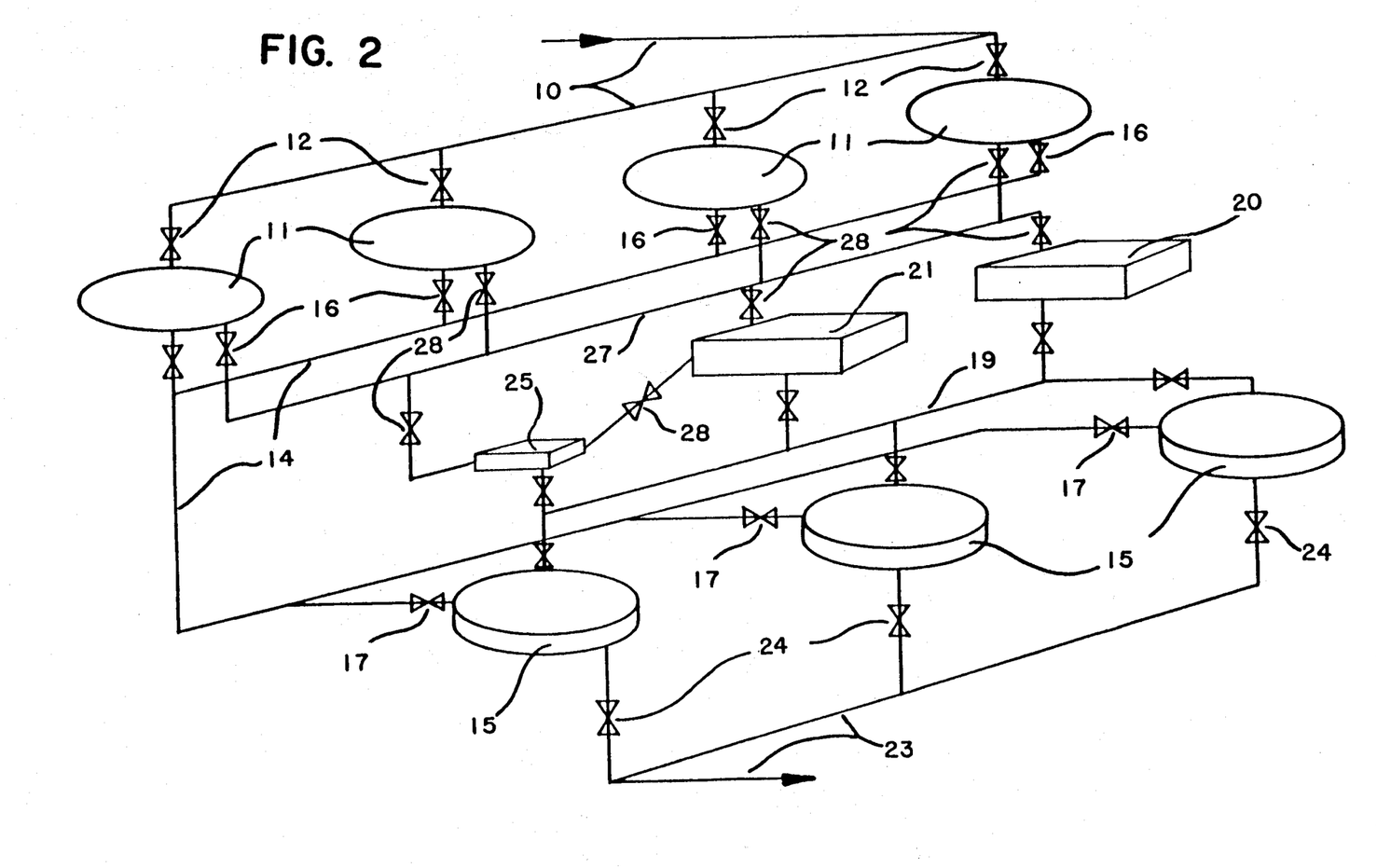
FIG. 2 is a diagram depicting the flow of materials when wastewater is treated according to a second aspect of the invention.

Referring to another aspect of the invention, as shown in FIG. 2, wastewater is directed by pipes 10 for aerobic digestion in a number of large concrete or steel reservoirs 11. The flow of wastewater into each reservoir is regulated by a respective valve 12.

After being aerated and stabilized as described by the method above the sludge produced by such treatment progresses through further pipes 14 to closed reservoirs 15 for anaerobic digestion, while the clear effluent is discharged. The rate of outflow of sludge from aerobic digestion is suitably regulated by respective valves 16. The inputs to the closed reservoirs are respectively regulated by valves 17.

When undergoing anaerobic digestion, the sludge derived from the wastewater generates methane which is collected through suitable pipes 19 for use as fuel for the air compression means 20 and 21.

It will be appreciated that all the valves indicated are centrally controlled enabling the establishment of dynamic equilibrium within the system whereby allowances ar provided for the progressive advancement of wastewater and sludge through the varied stages. In the preferred embodiment, a plurality of discrete digesters allows for the large variation in input of wastewater.

The pipes 23 in combination with valves 24 allow the passage of the clarified discharge from the reservoirs 15. Valves 24 are similarly centrally controlled whereby allowing for interdependent flow of wastewater and sludge during various stages of the treatment.

Air enriched with oxygen is generated by the pressure swing absorption method by unit 25. As this unit continuously operates at near its maximum capacity, the efficiency is maximized. As unit 25 includes a number of air separation units, it is possible to selectively actuate these separation units in response to the quantity of wastewater entering the system and subsequently vary the base supply of oxygen enriched air. This feature is known as turn-down. This feature, coupled with the dynamic control of supplemental air has the effect of reducing operating costs, as the daily fluctuations of wastewater received and the sludges generated therefrom are accommodated.

The flow of air, or air enriched with oxygen, is controlled by pipes 27 and valves 28. Both the source of such gases, and the destination, are variable and adjustable by the central processing unit.

Figure 3:
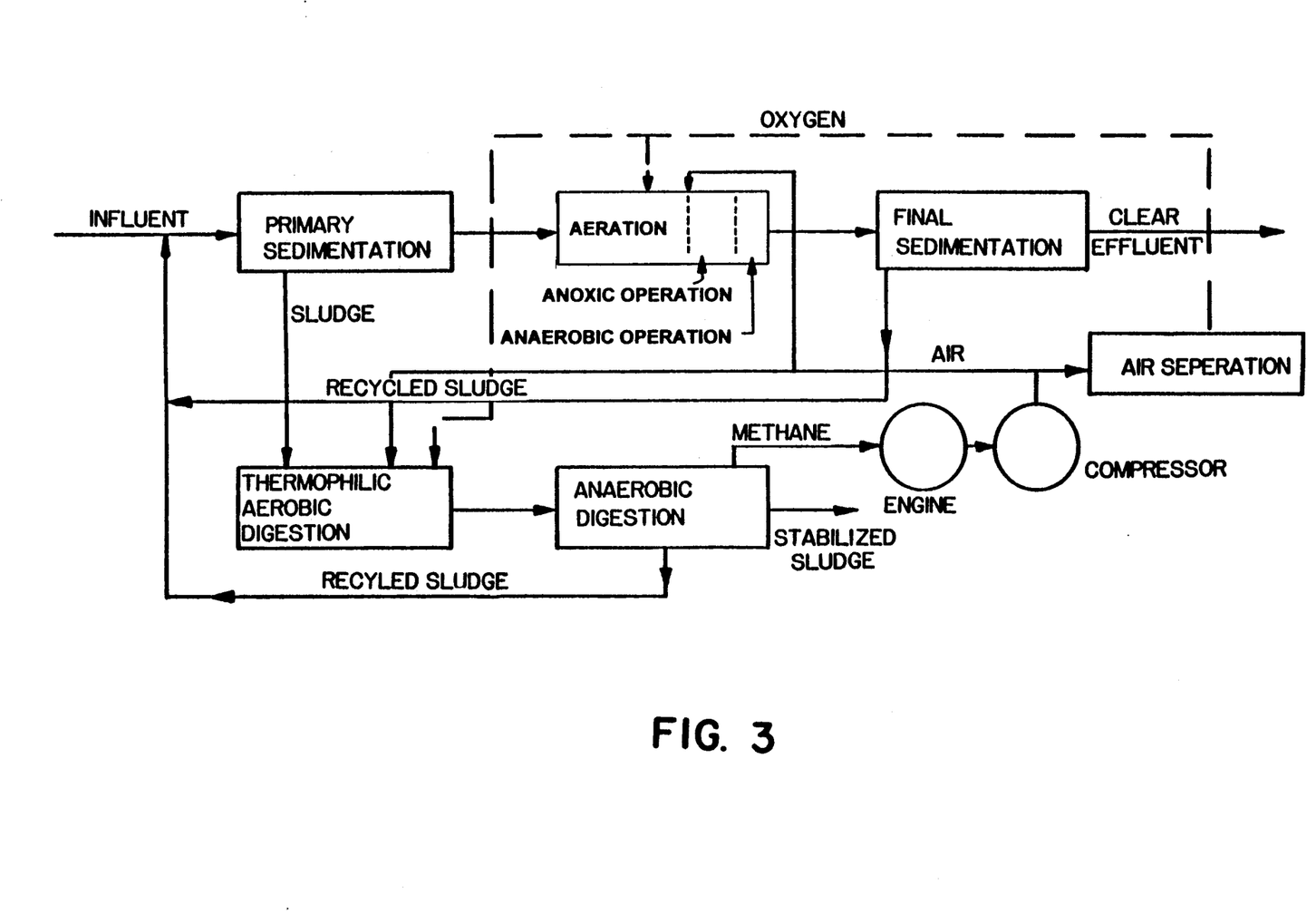
FIG. 3 is a flow chart of the process of the flow of materials described in FIG. 2.
Figure 4:
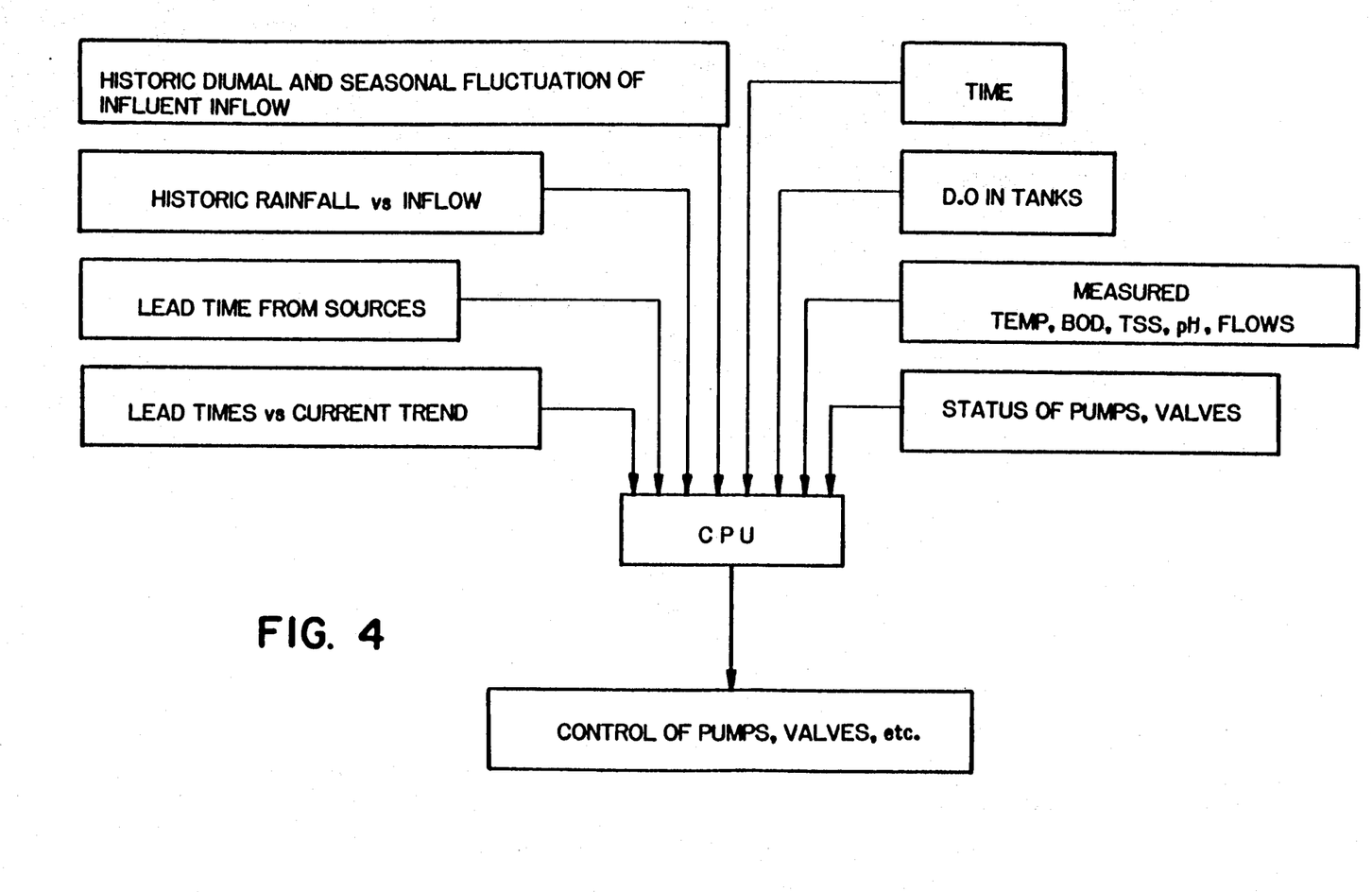
FIG. 4 is a block diagram of the central processing unit and inputs to which it would be responsive and outputs it is able to regulate.

This process is represented in the flow chart of FIG. 3.

A more complete treatment of wastewater is represented in the flow chart of FIG. 3. That is, influent wastewater including settleable solid material enters int primary sedimentation tanks, optionally along with predetermined quantities of recycled sludge. After settling and removal of sludge (also referred to as primary solids), the wastewater and any residual sludge are transferred to aeration tanks where oxygen and air are supplied as required by air compressors to encourage growth of the micro-organisms used in the activated sludge process in order to remove carbonaceous BOD. The supply of oxygen and/or air is carried out as described in any one of the above mentioned examples. Optionally, sections may be included in aeration tanks for anoxic operation to remove biological nitrogen or for anaerobic operation to remove biological phosphorous, or both.

After aeration, the wastewater is transferred into final sedimentation tanks where the sludge within the wastewater is allowed to settle and is removed. The clear effluent is then discharged. Sludge removed during any of the wastewater treatment steps, but especially from primary sedimentation, undergoes thermophilic aerobic digestion and subsequent anaerobic digestion where methane is obtained to provide supplementary fuel for the engines driving the air compressors.

It is evident from the above examples that the efficiency of a treatment plant is substantially improved when operated in accordance with the invention.

Although the invention has been described with reference to a specific example, it will be appreciated by those skilled in the art that the invention may be embodied in many other forms.

We claim:

1. A method for treating wastewater water by aerobic digestion, said method comprising:
   introducing into said wastewater contained within an uncovered aeration chamber a first fluid including an oxygen content of at least 50% to provide dissolved oxygen in accordance with a selected base load aerobic digestion capacity wherein said first fluid is produced on-site in conjunction with said wastewater treatment; and
   substantially simultaneously selectively introducing into said wastewater within the same aeration chamber in response to a reduction in the dissolved oxygen content of the wastewater, a second fluid to provide an additional variable load aerobic digestion capacity, wherein said base load and said variable load capacity in total provide a selected total aerobic digestion capacity.

2. A method according to claim 1 wherein said total aerobic digestion capacity is selected to provide acceptable capacity to meet peak loads.

3. A method according to claim 2 wherein the total aerobic digestion capacity satisfies the 95th percentile of peak oxygen demand.

4. A method according to claim 1 wherein said total aerobic digestion capacity is selected to provide acceptable capacity to meet average flows.

5. A method according to claim 1 wherein said first fluid includes an oxygen content of at least 60%.

6. A method according to claim 5 wherein said first fluid includes an oxygen content in the range of 80% to 95%.

7. A method according to claim 1 wherein said first fluid includes an oxygen content of at least 95%.

8. A method according to claim 1 wherein said first fluid is oxygen, or air enriched with oxygen.

9. A method according to claim 8 wherein said first fluid is produced by pressure swing absorption or cryogenic methods.

10. A method according to claim 1 wherein said second fluid is air.

11. A method according to claim 1 wherein said first fluid is introduced into said wastewater via a number of separate dissolution units, said units being selectively actuated to establish said base load.

12. A method according to claim 1 wherein following said aerobic digestion step, said wastewater undergoes anaerobic or anoxic treatment to achieve biological nitrogen and/or phosphorous removal.

13. A method according to claim 1 wherein said first fluid is supplied at a substantially constant maximum rate and the supply of said second fluid is varied in response to the oxygen demand of the wastewater being treated.

14. A method according to claim 13 wherein said first fluid is selectively supplied to said wastewater at one of a number of predetermined rates.

15. A method according to claim 1 wherein sludge is obtained from said wastewater following said aerobic digestion and final sedimentation, said sludge undergoing subsequent anaerobic digestion.

16. A method according to claim 15 wherein at least some of said second fluid is obtained by air compressed using power recovered from the products of said anaerobic digestion.

17. A method for treating sludge derived from wastewater treatment including the steps of:
   operating first and second valve means for respectively admitting and releasing said sludge to and from an uncovered aerobic digestion chamber;
   introduced into said released sludge in said uncovered aerobic digestion chamber via compression means both a first fluid including an oxygen content of at least 50% to provide a selected base load aerobic digestion capacity and a second fluid to provide an additional variable load aerobic digestion capacity, wherein said base load and said variable load capacity in total provide a selected total aerobic digestion capacity;
   introducing said released sludge into an anaerobic digestion tank whereby methane is extracted from said anaerobic digestion tank and forwarding said methane to power said compression means;
   controlling the operation of said first and second valve means from a central processing unit to maintain said treatment substantially in a dynamic equilibrium during variations in the wastewater conditions including one or a combination to be treated;
   (1) quantity of wastewater to be treated;
   (2) compositions of wastewater to be treated;
   (3) the dissolved oxygen content, temperature, biological oxygen demand, pH and relevant flows of the wastewater being treated; and
   (4) previously obtained data relating to the expected lead time between respective process steps and the relationship between these leads times and the current trend.

* * * * *